United States Patent [19]
Genduso et al.

[11] Patent Number: 5,745,728
[45] Date of Patent: Apr. 28, 1998

[54] PROCESS OR RENDERS REPEAT OPERATION INSTRUCTIONS NON-CACHEABLE

[75] Inventors: Thomas Basilio Genduso, Apex, N.C.; Edward Robert Vanderslice, Boca Raton, Fla.

[73] Assignee: International Business Machines Corporation, Armonk, N.Y.

[21] Appl. No.: 572,233

[22] Filed: Dec. 13, 1995

[51] Int. Cl.[6] .................................................. G06F 12/08
[52] U.S. Cl. ........................ 395/453; 395/445; 395/403; 395/375; 364/DIG. 1
[58] Field of Search ............................. 395/412, 497.02, 395/452, 449, 403

[56] References Cited

U.S. PATENT DOCUMENTS

| | | | |
|---|---|---|---|
| 4,437,149 | 3/1984 | Pomerene | 395/375 |
| 5,058,006 | 10/1991 | Durdan et al. | 395/449 |
| 5,226,138 | 7/1993 | Shermis | 395/403 |
| 5,301,295 | 4/1994 | Leary et al. | 395/452 |
| 5,333,296 | 7/1994 | Bouchard et al. | 395/497.02 |
| 5,481,689 | 1/1996 | Stamm et al. | 395/412 |

*Primary Examiner*—Tod R. Swann
*Assistant Examiner*—David C. Langjahr

[57] ABSTRACT

A Central Processing Unit is provided having an instruction processor for determining CPU instruction types. An instruction detector is included in the CPU for detecting whether a determined instruction is a non-cacheable repeat operation instruction. The CPU has an execution unit for executing instruction and for outputting a CPU signal indicating whether data associated with an instruction is cacheable.

8 Claims, 3 Drawing Sheets

PROCESS OR RENDERS REPEAT OPERATION INSTRUCTIONS NON-CACHEABLE

TECHNICAL FIELD

This invention relates to the field of central processing units (CPUs) and more particularly to CPUs supporting cache memory.

BACKGROUND

As the need for higher performance computer systems increases, the design of central processing units (CPU) incorporated within such systems are becoming more and more sophisticated. In order to achieve high performance CPUs utilize internal (L1) or external (L2) cache memory which are architected to be in closer proximity to the CPU relative to the system memory. Caches are high speed storage which exist between the CPU and memory. Typically the first time data or instructions are accessed from main memory a copy is placed into the cache. Should this data or instruction be accessed again it can be retrieved faster due to the higher speed of the cache over memory. However, typically the amount of storage contained in the cache is much smaller than the amount of storage represented by main memory. Therefore, cache coherency techniques exist to determine how data and instructions are maintained within the cache These techniques are based on maintaining a 'high hit rate' (getting the instructions and data from the cache as frequently as possible).

The cache memory which comprises high speed device which may be Static Random Access Memory (SRAM) increases CPU performance by storing the most recently used data by the CPU. Because of its proximity to the CPU and its high speed, cache memory allows CPU to access its needed data much faster without initiating a lengthy memory cycle for getting data from the system memory.

Because of cost associated with SRAM devices, cache memory has a finite size. Today, a typical L1 cache size is between 8 Kilobytes to 64 Kilobytes while L2 cache sizes range from 128 Kilobytes to 1 Megabytes. Generally, computer systems and CPUs are designed to force out, i.e. cast out, old cache data when transfer of new cache data causes size limitation of the cache size to be exceeded.

One of the more popular CPU platforms is Intel's X86 family of processors some of which offer CPUs having an L1 cache memory. For example, some of Intel's 486 processors include 8 Kilobytes of internal L1 cache. Whereas, Intel's Pentium Pro® has 16K L1 cache and 512K L2 cache.

However, much of the software available for X86 family of processors make use of certain instruction types, such as Repeat (REP) instructions, that cause useless data to purge useful cache data. Purging of useful CPU data degrades CPU performance since such data must be replenished by lengthy system memory cycles generated by the CPU.

REP instructions are used to manipulate blocks of data. The purpose of the manipulation can be to move the data from one area of memory to another, to compare a block of data with another block of data to search a block of data for a specific pattern or similar operation. The advantage of REP instructions is that a block of data can manipulated with a signal instruction. Unfortunately a REP instruction will tend to 'purge' the cache. This is to say, when the repeat operation is moving a block of data that block of data is also placed into the cache thereby removing that which is already in the cache. In many cases although the data is placed in the cache, the CPU has no further need for it. However data which the CPU may have had a need for is removed and must be accessed from memory with the associated lower performance. Therefore, a repetitive string search instruction may cause the L1 cache memory to be filled with useless string data at the cost of loss of useful cache data.

Therefore there is a need to improve CPU performance when certain instructions are executed by the CPU.

SUMMARY OF THE INVENTION

Briefly, according to the present invention a central processing unit coupled to a cache memory device via a data bus having a predetermined width. The CPU includes an instruction processing unit for processing CPU instructions having an instruction type field. The instruction processing unit includes an instruction type detector for detecting cacheable or non-cacheable instruction types. The CPU also includes an execution unit for executing the instructions. The execution unit is responsive to the instruction type detected by the instruction type detector for providing a CPU output signal indicating whether the data associated with a detected instruction type is cacheable.

DETAILED DESCRIPTION OF THE PREFERRED EMBODIMENT

Figure 1:
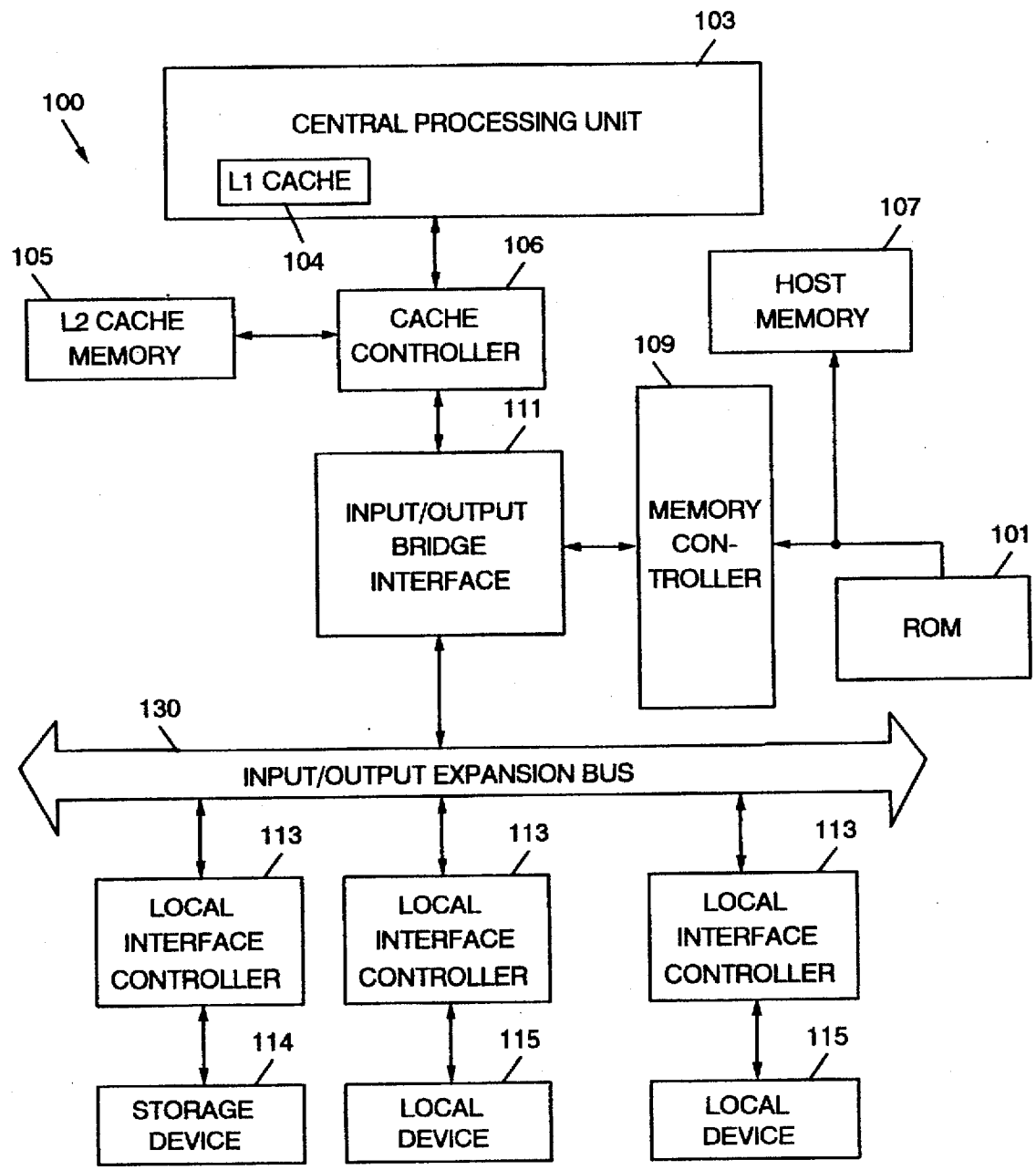
FIG. 1, is a block diagram of an exemplary computer system incorporating the CPU of the present invention.

Referring to FIG. 1, a block diagram of an exemplary computer system 100 incorporating the present invention is shown. The computer system 100 may comprise a Personal Computer System, such as an IBM Personal Computer or systems compatible therewith. The computer system 100 may operate as an stand alone work station or it may be part of a larger computer net work operating either as a client station or a server station.

The computer system 100 comprises two processing sides, a host processing side 110 which performs high level processing functions, such as those specified by operating system and applications, and a local processing side 120 which performs peripheral functions, such as providing storage media interface or communication interface for the computer system 100. The host processing side 110 and local processing side 120 are coupled to each other via an input/output (I/O) expansion bus 130. The I/O expansion bus 130 is compliant with one of many suitable I/O expansion bus protocols that allow a local interface controller to take control of the bus for performing a specified function, such as transferring blocks of data across the I/O expansion bus 130. Examples of such bus protocols include those defined by PCI or MicroChannel specifications which are hereby incorporated by reference.

The host processing side 110 may include a single central processing unit 103 or, in a multi-processing system, a plurality of central processing units for controlling the overall function of the computer system 100. The Central processing unit 103 may be one of many commercially available Central processing units such as Pentium Processor® offered by Intel® Corporation, or a PowerPC® processor offered by IBM® Corporation. As is well known, the Central processing unit 103 initially operates by executing firmware instructions stored in a Read-Only-Memory (ROM) 101. The firmware instructions, also known as Basic I/O System or BIOS may include instructions for detecting attached devices and instructions for a power on self test (POST). Generally, upon completion of the firmware instructions, the Central processing unit 103 executes operating system instructions by loading the OS from a local side storage device 114 into system memory 107. The transfer of data between the Central processing unit 103, the ROM 101 and the system memory 107 is controlled by a memory controller 109. Whereas, transfer of data between the host processing side 110 and the I/O expansion bus 130 is controlled by an I/O bridge interface 111. In order to enhance processor performance the Central processing unit 103 may include an internal cache (L1 cache) 104 and an optional external cache (L2 cache) 105 for storing most recently used data and instructions thus obviating the need for initiating long system memory access cycles. The cache memory generally comprises a high speed static random access memory (SRAM) which is positioned in close proximity to the Central processing unit 103. The data transfers in and out of the L1 and L2 caches are controlled by a well known cache controller 106. The cache controller stores and fetches data in a multiple of data bus width referred to as cache lines. The I/O bridge interface 111 is designed to interface between the memory controller 109, the Central processing unit 103 via the external cache controller 106, and the I/O expansion bus 130. The Central processing unit 103 interfaces with the I/O expansion bus 130 and consequently with the local processing side 120 via a suitable I/O bus bridge I/O bridge interface 111.

As explained later in detail the storage device 114 interfaces with the I/O expansion bus 130 via a controller local interface controller 113. One of ordinary skill in the art may appreciate that the depicted host processing side 110 is merely exemplary and depending on application various system architectures, uniprocessing or multi processing, may be designed to implement the functional requirement of the host side host processing side 110.

On the local processing side 120, the computer system 100 may include a plurality of local interface controllers 113, such as Small Computer System Interface (SCSI) controllers which are coupled to various peripheral devices 115. As such, storage devices, communication devices, printing devices, networking devices, imaging devices, etc. may be added to complement system functionality and features. For example, the computer system 100 may be utilized as a server station having a Fast Wide SCSI local interface controller with a Redundant Array of Inexpensive Drives (RAID) as storage devices.

Figure 2:
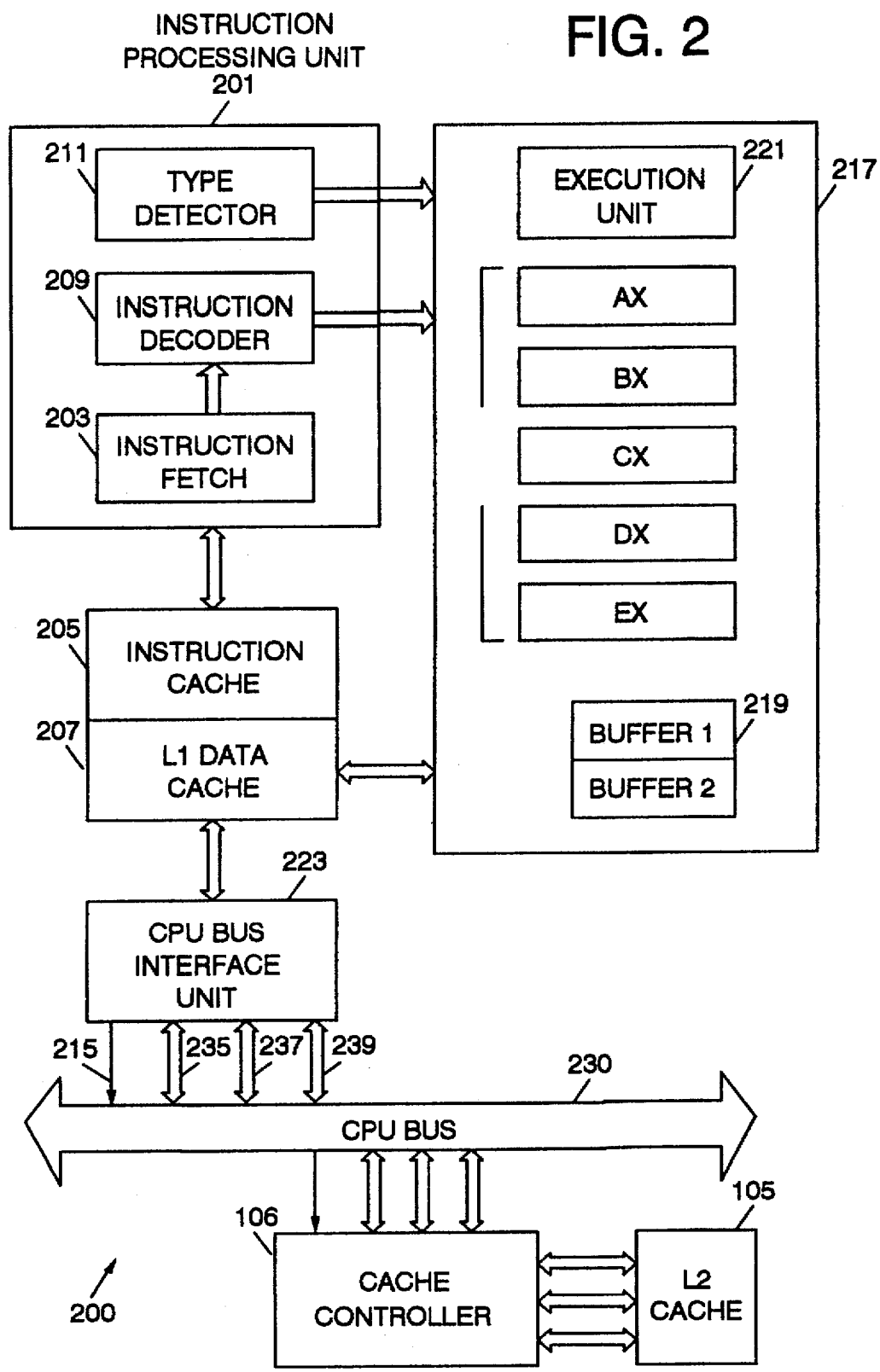
FIG. 2, is a block diagram of a CPU in accordance with the present invention.

Referring to FIG. 2, a block diagram of an exemplary central processing unit 200 is shown. The CPU 200 includes an instruction processing unit 201 which receives instruction from an internal L1 instruction cache device 205. The L1 instruction cache device 205 stores a plurality of instructions which are fetched for processing by a instruction fetch controller 203.

As is well know, the L1 instruction cache device 205 receives and stores instructions over a CPU bus 230 comprising a data bus 235, and address bus 237 and a control bus 239. The CPU local bus is coupled to and interfaces with a CPU interface unit 223 for interfacing the CPU with external components such as, the L2 external cache and the system memory shown in FIG. 1. The data bus 235 and address bus 237 have a predefined width comprising a predefined number of bits. The data and address bus width characterizes data transfer capability and the size of addressable area of system memory by the CPU. Accordingly, data bus 235 may for example comprise a 16-bit, 32-bit, or a 64-bit data width while the address bus may comprise a 16 thru 64 bit address width. The instruction processing unit among other things determines the type of the instruction and appropriately passes it to one or more execution units 221. As is well known super scalar CPUs may include a plurality of execution units for executing multiple tasks simultaneously. Depending on the instruction, the execution units may for example perform a mathematical or a logical operation on operand data provided by the instruction. The execution units receive needed data from an L1 data cache 207 which similar to the L1 instruction cache stores data received over the CPU bus or data received from the E-unit 217. The CPU also includes a set of general registers identified as AX-EX for storing in a well known maimer instruction operand, temporary data and indexes as dictated by the instruction 300. The instruction processing unit upon receipt of the instruction 300 processes it to determine the instruction type by decoding. Instruction decoding is performed by the instruction decoder 209. Upon execution of the instruction, the E-unit appropriately outputs signals on the data bus 235, address bus 237 and/or control bus 239 over the CPU interface unit 223.

Figure 3:
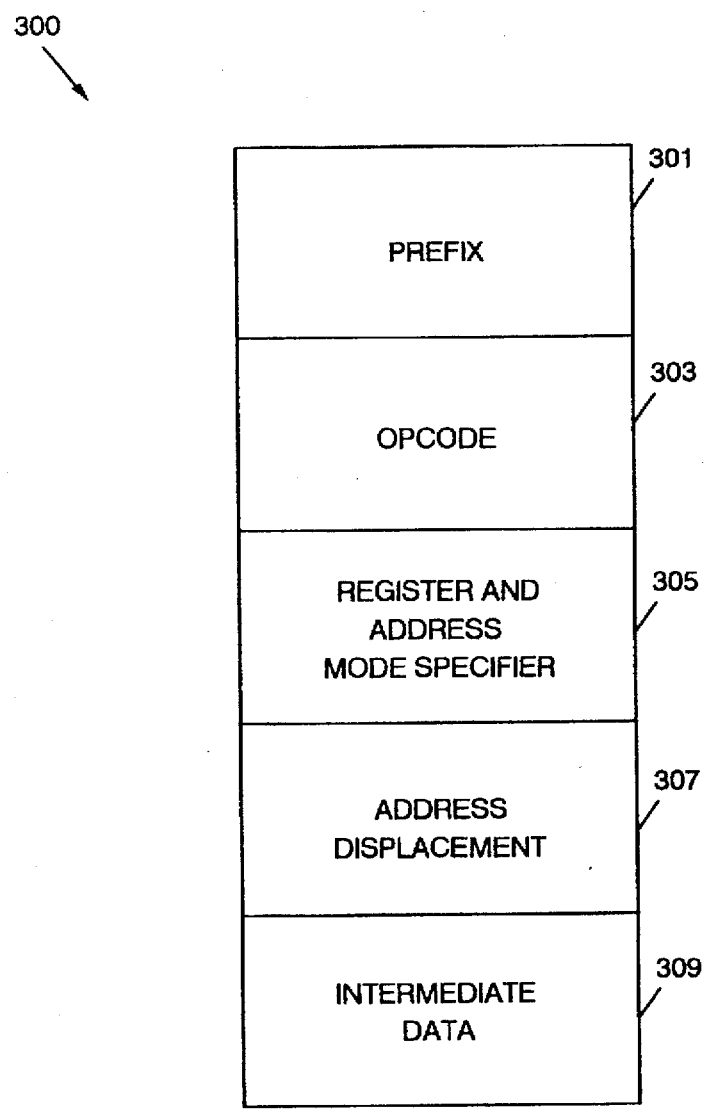
FIG. 3 is a diagram of an instruction format executed by the CPU of FIG. 1.

Referring to FIG. 3, a pictorial diagram of an exemplary instruction 300 is shown. The illustrated instruction 300 is a Complex Instruct Set Command (CISC) instruction having a format compatible with CISC instruction format used in X86 processor platform offered by Intel corporation. The instruction 300 includes a prefix portion 301, an opcode portion 303 defining the logical or mathematical command to be performed by the execution units 221, an addressing mode specifier field 305, a address displacement field 307 and a immediate data field 309. As is well known CISC instructions have a variable length and some opcodes may not utilize all the instruction fields. Intel CISC instruction format and programming therefore is very well known in the art and is more fully defined in Intel i486 Microprocessor Programmer's Reference Manual which is hereby incorporated by reference.

According to the present invention the instruction processing unit 201 includes an instruction type detector 211 for detecting whether an instruction type preceding an opcode is a repeatable type. For example, if the prefix portion 301 indicates a repeat operation, the instruction type detector 211 is adapted to detect such repeat instruction type. The E-unit 217 is responsive to the instruction type detector 211's detection of a repeatable instruction type for generating a signal 215 indicating that the data associated with the detected instruction is not to be placed into the cache The Does Not Cache (DNC) indicator signal 215 is outputted from the CPU via the bus interface unit 223. The CPU 103 further includes a set of buffers 219 and which are used as temporary storage area to perform operations on the data associated with the detected repeat instructions. In the preferred embodiment, the set of buffers 219 comprises two such buffers each of which have two cache line width. That is, the width of each buffer of the buffer set 219 is equal to twice the size of the cache line. This buffer size insures that all data involved in the repetitive move instructions are properly stored.

The DNC signal is used with the fetching or storing of data or instructions which are cacheable (not memory mapped I/O or such) and simply indicates to all caches to handle the data in the following manner:

```
IF data is to be loaded into the processor AND the DNC signal is set
    THEN
    IF data is currently in the cache
    THEN give the cache line containing the data to the processor
    ELSE data is not currently in the cache
        DO
        fetch cache line of data
        give the cache line containing the data to the processor
        do not store cache line in cache
        END
IF data is to be stored from the processor AND the DNC signal is set
    THEN
    IF data is currently in the cache
    THEN update cache with data from processor
    ELSE data is not currently in the cache
        DO
        output the cache line containing the data
        do not store cache line in cache nor attempt to update cache.
        END
    IF DNC signal is not set
    THEN data is not associate with a REP instruction.
```

Repeat (REP) instructions are a class of instructions whereby the instruction is automatically repeated a predetermined number of times. The number of times the instruction is to re-executed is determined at the time the instruction is executed by the contented of a specific general purpose register (GPR) within the CPU. This specific GPR is referred to as the count register (CREG).

The instructions which can be repeated are the following:

Compare String (CMPS)

Compares the string starting at the memory address pointed to by the source register to the string starting at the memory address pointer to by the destination register. Depending on the specific op-code of the instruction, the compare can be on a byte, word, or double word basis. For the REP operation the source and destination address are incremented and the next sequential byte, word or double word are compared. This operation is repeated the number of times indicated by the CREG.

Scan String (SCAS)

Compares the contents of the source register to the string starting at the memory address pointer to by the destination register. Depending on the specific op-code of the instruction, the compare can be on a byte, word, or double word basis. For the REP operation the destination address are incremented and the next sequential byte, word or double word is compared. This operation is repeated the number of times indicated by the CREG.

Load String (LODS)

Loads the destination register with the string starting at the memory address pointer to by the source register. Depending on the specific op-code of the instruction, the load can be on a byte, word, or double word basis. For the REP operation the source address is incremented, and the next sequential byte, word or double word is loaded. This operation is repeated the number of times indicated by the CREG.

Store String (STDS)

Stores the contents of source register at the memory address pointer to by the destination register. Depending on the specific op-code of the instruction, the store can be on a byte, word, or double word basis. For the REP operation the destination address is incremented, and the contents of the source register is stored at the next sequential byte, word or double word address of memory. operation is repeated the number of times indicated by the CREG.

OUT String (OUTS)

Stores the contents of the memory location pointed to by the source register to the I/O port address pointed to by the destination register. Depending on the specific op-code of the instruction, the store can be on a byte, word, or double word basis. For the REP operation the source address is incremented, and the next sequential byte, word or double word of memory is stored to the I/O port address pointed to by the destination register. The operation is repeated the number of times indicated by the CREG.

IN String (INS)

Loads the data from the I/O port address pointed to by the source register. to the memory location pointed to by the destination register. Depending on the specific op-code of the instruction, the store can be on a byte, word, or double word basis. For the REP operation the destination address is incremented, The operation is repeated the number of times indicated by the CREG.

MOVE String (MOVS)

Moves the data at the memory location pointed to by the contents of the source to the memory location pointed to by the destination location Depending on the specific op-code of the instruction, the store can be on a byte, word, or double word basis. For the REP operation the source and destination address are incremented, and the next sequential byte, word or double word of memory is moved. The operation is repeated the number of times indicated by the CREG.

Described is the pseudo code implementation of the present invention for each of the above defined REP instruction:

To start with, for all of the following operations the CREG has been loaded with the number of times the repeat operation is to be executed, at some time prior to the execution of the instruction which is to be repeated. For all the following operations the two buffers 219 are referenced as A buffer and B buffer.

```
REP CMPS
    Check the buffers of the execution unit.
    IF the required data is currently in these buffers
    THEN
        no need to access the caches.
    ELSE
        DO
        data read request is issued by the execution unit.
        DNC signal is set.
        A cache line amount of data is loaded into the A buffer
        when the loads are complete,
        the DNC signal is reset.
        A second data read request is issued by the execution unit.
        the DNC signal is set.
        A cache line amount of data is loaded into the B buffer
        when the loads are complete,
        the DNC signal is reset.
        END
    The compare operation is executed.
    Decrement the CREG and if not zero repeat the operation
REP SCAS
    Check the buffer of the execution unit.
    IF the required data is currently in the buffers
    THEN no need to access the caches
    ELSE
        DO
        data read request is issued by the execution unit.
        DNC signal is set.
        A cache line amount of data is loaded into the A buffer
        WHEN the load is complete
        THEN DNC signal is reset.
        END
    The scan operation is executed.
    Decrement the CREG and If not zero repeat the operation
REP LODS
    Check the A buffer of the execution unit.
    IF the required data is currently in the buffers
    THEN there is no need to access the caches.
```

```
        ELSE
        DO
           a data read request is issued by the execution unit.
           the DNC signal is set.
           A cache line amount of data is loaded into the A buffer
           when the load is complete
           the DNC signal is reset.
        END
        The load operation is executed.
        Decrement the CREG and if not zero repeat the operation
REP STDS
        A data store is issued by the execution unit
        the DNC signal is set.
        When the store is complete,
        the DNC signal is reset.
        Decrement the CREG and if not zero repeat the operation
REP OUTS
        IF the required data is currently not in the A buffer
        THEN
        DO
        A data read request is issued by the execution unit.
        the DNC signal is set.
        When the store is complete
        the DNC signal is reset.
        END
        send the data to the port
        Decrement the CREG and if not zero repeat the operation
REP INS
        IF this is the first time through the rep operation then,
        THEN
        DO
        issued data request by the execution unit
        set the DNC signal is set.
        Receive a cache line amount of data is into the A buffer
        When the load is complete
        reset the DNC signal
        END
        ELSE this is not the first time through of the rep operation
        THEN
        DO
        IF the required data location are not currently in the A buffer
        THEN
           DO
           issue a data store of the A buffer
           set the DNC signal
           when data store is completed
           reset DNC signal
           issued data request by the execution unit.
           set the DNC signal is set.
           Receive a cache line amount of data is into the A buffer
           When the load is complete
           reset the DNC signal
           END
        move data from A buffer to B buffer
        END
        Decrement the CREG and if not zero repeat the operation When the
        CREG is equal to zero the REP IN is Completed at that time a data
        store of the A buffer is issued by the execution unit.
        simultaneously the DNC signal is set. When the store is complete,
        the DNC signal is reset. Load the data from the port into the A
        buffer
REP MOVS
        Check the A buffer of the execution unit.
        IF the required data is currently in the buffers
        THEN there is no need to access the caches.
        ELSE
        DO
        issued data request by the execution unit.
        set the DNC signal is set.
        Receive a cache line amount of data is into the A buffer
        When the load is complete
        reset the DNC signal
        Check the B buffer of the execution unit.
        END
        IF the required storage locations are currently in the B buffer
        THEN
        DO
        there is no need to access the caches.
        Move the data from the A buffer to the B buffer
        END
        ELSE
        IF this is the first time through the rep operation then,
        THEN
        DO
           issued data request by the execution unit.
           set the DNC signal is set.
           Receive a cache line amount of data into the A buffer
           WHEN the load is complete
           THEN reset the DNC signal
        END
        ELSE this is not the first time through of the rep operation
        DO
           issue a data store of the B buffer
           set the DNC signal is set.
           when data store is completed
           reset DNC signal
           issued data request by the execution unit.
           set the DNC signal is set.
           Receive a cache line amount of data is into the B buffer
           WHEN the load is complete
           THEN
           DO
           reset the DNC signal
           move data from A buffer to B buffer
           END
        END
        Decrement the CREG
        IF not zero repeat the operation
        When the CREG is equal to zero
        the REP MOVS is completed at that time a data store of the B
        buffer is issued by the execution unit. simultaneously the DNC
        signal is set. When the store is complete, the DNC signal is reset.
```

It may be appreciated that this invention eliminates the problem of cache purging during repeat instructions by preventing the repeat instructions from impacting the cache (or caches for systems having multiple levels of CPU caches). The Does Not Cache (DNC) signal is unique in that when data is transferred, the data is to be treated as if it were cacheable. Data is transferred a cache line at a time. However when the DNC signal is set caches will not load or store data in to the cache consistent with maintaining data coherency within the system.

As described above, this invention accomplishes this by using a new signal referred to as Does Not Cache (DNC). DNC is an indicator to the caches that this reference is to be handled as a normal cache access, except that the data associated with this request is not to be placed into the cache. This is different from a request which is non-cacheable. non-cacheable data is data which should not be placed into a cache. Memory mapped I/O is an example of such data. Non-cacheable data is typically handled differently by the system. Typically when non-cacheable data is fetched it is not fetched as a cache line. Also non-cacheable data is typically handled differently in regards to cache snooping. According to the present invention all repeat instruction types are designated as non-cacheable. That is, the data associated with such instruction type is non-cacheable. This designation has been made to avoid casting out valuable cache data and replacing them with useless data involved in a repetitive move instruction. Instead the set of buffers 219 are used as temporary storage space for storing the data associated with the repetitive command type. As such, each buffer is designed to have a width equal to a multiple of the data width of the CPU bus.

What is claimed is:

1. A processor, comprising:
    a cache for storing instructions and associated data, said cache having an associated cache line size;
    an instruction type detector for detecting cacheable repeat instructions, wherein a repeat instruction is one of a class of instructions that are automatically repeated a predetermined number of times; and an execution unit for generating a do-not-cache (DNC) signal in response to the detection of a cacheable repeat instruction by said instruction type detector, wherein the data associated with a cacheable repeat instruction is not cached in response to said signal.

2. The processor of claim 1, further comprising at least one buffer capable of storing at least one cache line and, in response to said DNC signal, the data associated with a cacheable repeat instruction is stored in said buffer for use by said execution unit during the execution of a cacheable repeat instruction.

3. The processor of claim 1, wherein said cacheable repeat instructions include at least one of the following types of instructions: compare string, scan string, load string, store string, out string, in string, and move string.

4. The processor of claim 2, wherein said cacheable repeat instructions include at least one of the following types of instructions: compare string, scan string, load string, store string, out string, in string, and move string.

5. An information processing system, comprising:

a first cache for storing instructions and associated data, said first cache having an associated cache line size;

an instruction type detector for detecting cacheable repeat instructions, wherein a repeat instruction is one of a class of instructions that are automatically repeated a predetermined number of times; and an execution unit for generating a do-not-cache (DNC) signal in response to the detection of a cacheable repeat instruction by said instruction type detector, wherein the data associated with a cacheable repeat instruction is not cached in said first cache in response to said signal;

a second cache for storing instructions and associated data; and a cache controller for controlling the caching of instructions and associated data in said second cache and for receiving said DNC signal, wherein said cache controller inhibits the caching in said second cache of data associated with a cacheable repeat instruction in response to said DNC signal.

6. The information processing system of claim 5, further comprising at least one buffer capable of storing at least one cache line and, in response to said DNC signal, the data associated with a cacheable repeat instruction is stored in said buffer for use by said execution unit during the execution of a cacheable repeat instruction.

7. The information processing system of claim 5, wherein said cacheable repeat instructions include at least one of the following types of instructions: compare string, scan string, load string, store string, out string, in string, and move string.

8. The information processing system of claim 6, wherein said cacheable repeat instructions include at least one of the following types of instructions: compare string, scan string, load string, store string, out string, in string, and move string.

* * * * *